(12) United States Patent
Scott et al.

(10) Patent No.: US 7,808,712 B2
(45) Date of Patent: Oct. 5, 2010

(54) IMAGING SYSTEM

(75) Inventors: Andrew M Scott, Worcestershire (GB);
Andrew C Lewin, Worcestershire (GB);
Simon C Woods, Worcestershire (GB)

(73) Assignee: QinetiQ Limited, London (GB)

( * ) Notice: Subject to any disclaimer, the term of this patent is extended or adjusted under 35 U.S.C. 154(b) by 945 days.

(21) Appl. No.: 10/543,685

(22) PCT Filed: Jan. 27, 2004

(86) PCT No.: PCT/GB2004/000317
§ 371 (c)(1),
(2), (4) Date: Jul. 28, 2005

(87) PCT Pub. No.: WO2004/068090
PCT Pub. Date: Aug. 12, 2004

(65) Prior Publication Data
US 2006/0171021 A1    Aug. 3, 2006

(30) Foreign Application Priority Data
Jan. 28, 2003 (GB) ................................. 0301923.9

(51) Int. Cl.
*G02B 27/14* (2006.01)
(52) U.S. Cl. ..................................... 359/629
(58) Field of Classification Search ......... 359/629–631, 359/636, 638–640, 726, 730, 732
See application file for complete search history.

(56) References Cited
U.S. PATENT DOCUMENTS
4,005,285 A * 1/1977 Price ....................... 250/208.1
4,487,490 A * 12/1984 McKee ....................... 396/330

(Continued)

FOREIGN PATENT DOCUMENTS
| JP | 4-93912 | 3/1992 |
|---|---|---|
| JP | 4-267203 | 9/1992 |
| WO | 99/46768 | 9/1999 |

OTHER PUBLICATIONS

International Search Report for PCT/GB2004/000317 dated May 18, 2004.

(Continued)

*Primary Examiner*—Ricky L Mack
*Assistant Examiner*—Vipin M Patel
(74) *Attorney, Agent, or Firm*—Nixon & Vanderhye P.C.

(57) ABSTRACT

Optical apparatus for simultaneously focussing first and second coaxially spaced object planes in respective separate first and second areas of a common image plane 13 (such as the sensor of a CCD camera) comprises non-diffractive beam-splitter means for receiving light from said object planes along a common path 2 for transmission to said first and second image areas along respective first and second optical paths 3, 4, and reflective or transmissive focussing means 8 arranged to bring said first and second object planes into focus in said first and second areas. The object planes may be differentiated by having different length paths 3,4 (different physical lengths and/or using a differential optical delay), and/or by having different focussing powers in the two paths. In an add-on for a camera, differently curved mirrors of long focal length modify the main camera lens. Polarising optics may be used to separate the two images. The apparatus may be used for 3-D imaging or wavefront analysis.

25 Claims, 4 Drawing Sheets

U.S. PATENT DOCUMENTS

| | | | | |
|---|---|---|---|---|
| 5,135,183 | A | * | 8/1992 | Whitney .................... 244/3.16 |
| 5,384,455 | A | | 1/1995 | Paxman |
| 5,774,269 | A | * | 6/1998 | Snoeren ...................... 359/636 |
| 6,081,327 | A | | 6/2000 | Gaechter et al. |
| 6,107,617 | A | * | 8/2000 | Love et al. ............... 250/201.9 |
| 6,115,121 | A | * | 9/2000 | Erskine ...................... 356/450 |
| 6,219,146 | B1 | * | 4/2001 | Innes et al. ................. 356/508 |
| 6,233,054 | B1 | * | 5/2001 | Theriault .................... 356/451 |
| 6,975,457 | B1 | * | 12/2005 | Greenaway et al. ......... 359/565 |
| 2002/0167642 | A1 | * | 11/2002 | Jones et al. ................. 351/206 |

OTHER PUBLICATIONS

UK Search Report for GB 0301923.9 dated Mar. 19, 2003.
Blanchard et al., *Simultaneous multiplane imaging with a distorted diffraction grating*, Applied Optics, vol. 38, No. 32, Nov. 10, 1999, pp. 6692-6699.
English translation of Japanese Examination Report dated Sep. 14, 2009 for JP 2006-502200.

* cited by examiner

IMAGING SYSTEM

This application is the US national phase of international application PCT/GB2004/000317 filed 27 Jan. 2004 which designated the U.S. and claims benefit of GB 0301923.9 filed 28 Jan. 2003, the entire contents of each of which are hereby incorporated by reference.

Our copending UK Patent Application No. GB 0205240.5 relates to a measuring apparatus/method for the real time determination of data relating to the local shape (or distribution of local phase) of a radiation wavefront arriving at a pupil plane. While the described arrangement may be used for different types of radiation, one particular use is with light, and particularly with visible or infra-red light. As particularly described, the embodiment requires the comparison of the intensity of the radiation distribution in measurement planes equally spaced either side of, and closely adjacent, the pupil plane.

As described in that application, for this purpose (or for other optical measurements) it is possible merely to use a pair of lenses and a beam splitter for directing respective focussed images of the two planes onto different image planes where image sensors are located. However, there are potential disadvantages in requiring the maintenance of accurate alignments of the optical components and sensors, and simultaneous operation of two separate sensors.

Therefore as more particularly preferred, and as disclosed in our copending application, the aforesaid intensity distribution comparison is effected with the use of a distorted diffraction grating of the type described in our earlier copending International Patent Application No. WO 99/46768 (published in the name of the Secretary of State for Defense), or with a computer generated hologram. In so doing, the two measurement planes can simultaneously be brought to a focus as laterally displaced images on a common sensor plane, e.g. of a sensor array, for example by using the positive and negative first diffraction orders from the grating. Zero order diffracted light is also transmitted by the grating, and could be used, for example, for simultaneously providing an image of a remote object (as opposed to the input pupil) either on the same sensor plane or another plane, which could also comprise a sensor or sensor array.

The employment of a grating or hologram is not without its attendant disadvantages. In particular, it is well known that such elements have a high dispersion, and therefore to provide a trustworthy measurement ideally the grating should be used in conjunction with incoming monochromatic or narrow bandwidth radiation.

The alternative of restricting the bandwidth of the incoming radiation to be measured is not always possible. For instance, it may be desired to use the output of the measuring system to provide a range measurement of a viewed object for controlling the focus of a visible optical camera providing the input pupil, i.e. an autofocus system. Although as mentioned above, zero order diffracted light is available for this purpose, the dispersion exhibited by the grating and/or the response of the measuring arrangement to an extended image may introduce a high degree of unreliability into the autofocus function.

Accordingly, it is desirable to obtain images derived from two axially displaced planes in different areas on a common plane in a manner which avoids or reduces the problem of dispersion.

In a first aspect the present invention provides optical apparatus for simultaneously focussing first and second coaxially spaced object planes in respective separate first and second areas of a common image plane, the apparatus comprising non-diffractive beamsplitter means for receiving light from said object planes along a common path for transmission to said first and second image areas along respective first and second optical paths, and focussing means arranged to bring said first and second object planes into focus in said first and second areas.

The beamsplitter is termed "non-diffractive" to avoid confusion with the distorted grating of our earlier applications. In general it will be a conventional splitter using surfaces which are partially transmissive and partially reflective. However, an alternative would be to use a polarising splitter where light is directed along separate optical paths according to its polarisation due to the differing refractive indices presented to the two polarisations (these are commonly linear polarisations, but could be circular or other types of polarisation; generally the two types of polarisation will be complementary).

In some embodiments of the invention the beam splitter means and the focussing means are provided by a single optical element, for example a birefringent lens construction. However, more commonly these functions are separate.

The beam splitter means may include a beam splitter of the type providing generally parallel said first and second paths. Where the beam splitter means comprises a beam splitter of the type providing first and second output paths which are significantly angularly separated, there may also be provided means such as one or more reflective surfaces for rendering those paths generally parallel, e.g. when they reach the common plane.

The light may traverse the beam splitter once or a plurality of times. In two embodiments to be more particularly described, respective reflective surfaces are provided for directing the first and second paths back into the splitter and thence to the first and second image areas in the common image plane.

The focussing means may comprise one or more refractive elements; or one or more reflective focussing elements; or a combination of refractive and reflective focussing elements.

In a first form of optical apparatus the beam splitter is located between the common plane and the focussing means. In a second form the focussing means is located between the splitter and the common plane and may comprise elements which are common to (i.e. intercept) the first and second paths and/or separate elements for the first and second paths. In a third form, where the focussing means comprises a plurality of focussing elements, at least one element precedes the beam splitter and at least one element follows it.

In the first form of optical apparatus, the focussing means is located in the common path. To focus the first and second coaxially spaced object planes on the common image plane the first and second paths need to be of different optical lengths. This may be done by malting the path lengths physically different, or by inserting an optical delay in at least one of the paths, or by a combination of both techniques.

Physical differences in the first and second path lengths may be obtained by any method known per se, for example by the use of at least one reflector in at least one of the first and second paths to extend it. In one embodiment, reflectors are inserted in both the first and second paths at different spacings from the beam splitter and/or common plane. For example, appropriately located reflective surfaces in the first and second paths may serve to return light to the beamsplitter and thence to the common image plane, the surfaces being unequally spaced from the beamsplitter.

The introduction of an optical delay may be effected by the insertion of a relatively dense transmissive plate in at least one of the first and second paths. In some embodiments of the invention the beam splitter and an optical delay means can be provided by a common optical element such as a wedge prism as more particularly described later.

Where the beam splitter is polarisation sensitive and so provides output beams of different polarisations, e.g. complementary polarisations, or where the first and second paths comprise means for selecting different polarisations, the relatively dense transmissive plate could be arranged to provide different optical path lengths to the different polarisations (for example birefringent where the two output beams are linearly polarised). For the requisite effect, it should be placed after the focussing means, or at least after a first focussing element thereof—this may be in the common path or in at least one of the first and second paths (or a respective plate located in each of said first and second paths) as determined by the overall arrangement. Preferably a depolariser is located before the polarising beam splitter or polarisation selecting means for equalising the powers of the two polarisations.

In an alternative arrangement, the focussing means and the delay means are provided by a common optical element such as a birefringent lens, on one or other side of the splitter, which again is polarisation sensitive or where there are means for selecting different polarisations in the first and second paths.

In the second form of apparatus, the focussing means may comprise an optical element which has a sufficient aperture to accommodate both the first and second paths) and is therefore common to both paths. If this is the only focussing element, the first and second optical path lengths are arranged to be different as in the first form of apparatus.

Alternatively the focussing means may comprise separate focussing elements in each of the first and second paths. The focussing elements may have the same focussing powers, in which case the first and second optical path lengths may be arranged to be different, as in the first form of apparatus, and/or their optical spacings from the beam splitter or common plane may be different to focus both object planes on the common plane. Alternatively the focussing elements may have different focussing powers, in which case they may have similar spacings relative to the common plane and beam splitter and still provide focussing of both object planes on the common plane. Nevertheless, it is still possible to locate them differently in the first and second paths, and/or to differentiate the first and second optical path lengths—the only requirement is that the arrangement is such that the first and second object planes are both brought to focus in the common plane.

Similar considerations to the foregoing apply in the third form of apparatus, according to whether the focussing element between the beam splitter and the common plane is common to both first and second paths, or whether a single such focussing element is provided in one of the first and second paths, or whether separate such focussing elements are provided in respective ones of the first and second paths.

The apparatus may also include image sensor means having a sensor surface in the common plane for receiving both the first and second images and providing respective image signals. Preferably the sensor surface comprises a single sensor area common to both the first and second image areas.

In a second aspect the present invention provides optical apparatus for use with an auxiliary lens for simultaneously focussing first and second coaxially spaced object planes in respective separate first and second areas of a common image plane, the apparatus comprising non-diffractive beamsplitter means for receiving light from said object planes along a common path in use to said first and second image areas along respective first and second optical paths, and focussing means arranged to cooperate with said auxiliary lens to bring said first and second object planes into focus in said first and second areas in use. It will be appreciated that the considerations set out above regarding the beam splitter and focussing means of the first aspect of the invention apply equally to the second aspect.

The second aspect of the invention provides apparatus which can be used where, for example, the auxiliary lens is that of a camera, preferably an electronic camera, with the common plane being the image or sensor plane of the camera. In this instance the auxiliary lens lies between the optical apparatus and the common plane. However, although this is likely to be the most practical arrangement, the second aspect of the invention enables use of the apparatus between the common plane and the auxiliary lens (for example mounting the apparatus within an imaging apparatus such as a large camera), or even where the auxiliary lens is located in use within the common, first, or first and second paths.

One particularly preferred from of apparatus according to either aspect of the invention has an input pupil, and the first and second object planes lie either side of said input pupil.

Image signals provided by an electronic camera or other imager having a sensor surface in the common plane may be processed to compare the first and second images, the result being analysed for determining a property of the optical wave at said input pupil. A convenient manner of doing this in real time is explained in our copending UK Patent Application No. GB 0205240.5 mentioned above.

One such property is tip/tilt, and in such a case it is possible to locate a movable mirror in an optical path from said input pupil, and to employ means responsive to the measured tip/tilt to control the tip/tilt mirror. The optical path including the mirror may or may not be one of the first and second paths, and the control may be for example normal forward control, or a feedback type of control to minimise tip/tilt.

Another such property is defocus, and it is possible to derive therefrom a measure of the range of an object in the field of view of said input pupil. Either the measured defocus or the measured range may be employed to control the controllable focussing means in a path from the input pupil, which may or may not be one of the first and second paths. Again, the control may be for example normal forward control, or a feedback type of control to minimise defocus.

In a more general application, the measured property comprises one or more weighting coefficients of orthogonal functions describing the wavefront, e.g. Zernike modes (see our copending application mentioned at the commencement of this description). The coefficient(s) may be useful per se (for example is assessing atmospheric turbulence) or a spatial light modulator may be placed in an optical path from said input pupil (which may or may not be one of the first and second paths) and controlled in response to the measured coefficient(s). Again, the control may be for example normal forward control, or a feedback type of control to minimise the coefficient(s).

Apparatus according to then invention may also be employed in a 3-D imaging system such as generally of the type described in our copending International Patent Application WO 99/46768 mentioned above.

Other features and advantages of the invention will become clear upon consideration of the appended claims, to which the reader is referred, and upon perusal of the following more detailed description of embodiments of the invention, made with reference to the accompanying drawings, in which:

Figure 1:
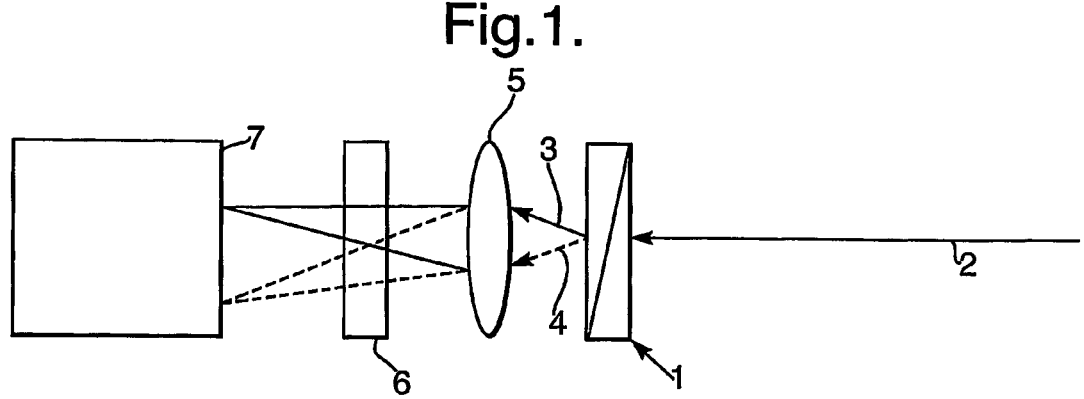
FIG. 1 shows in schematic form a first embodiment of the invention according to the first aspect, employing a polarising beam splitter and a calcite plate.

FIG. 1 shows a Wollaston prism 1 for receiving input light from a common path 2 and splitting it into angularly displaced beams on first and second paths 3, 4 with respective complementary orthogonal linear polarisations. Both beams 3, 4 are intercepted by a lens 5 followed by a calcite plate 6 and then fall upon a common plane embodied as the sensitive surface of a sensor such as a CCD camera 7 or other electronic camera or image sensor.

The calcite plate is oriented so that its two birefringent axes are parallel to the respective polarisation directions of the beams 3, 4, and as a result the plate 6 presents an optical thickness to one beam which is greater than the optical thickness presented to the other beam than that seen by the other beam. The distances from the lens 5 to (coaxial) object planes which are brought into focus on the sensor 7 are therefore different for the two polarisations. The focussed images of the two coaxial focussed planes are laterally displaced on the CCD camera due to the action of the prism 1.

In a variant, the lens 5 and prism 1 are replaced by a birefringent lens so as to bring two coaxial spaced planes into focus in the plane of the sensor, according to polarisation. While it might be possible to align the lens so that it also performs the function of laterally separating the focussed planes on the sensor, more preferably this function is performed by a separate dedicated element such as a polarisation sensitive beam splitter (e.g. a Wollaston prism).

Figure 2:
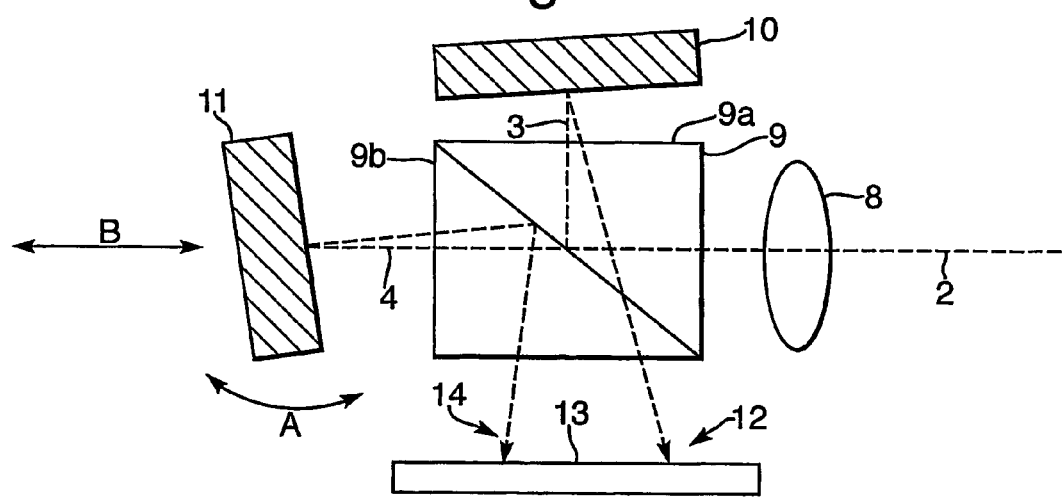
FIG. 2 shows in schematic form a second embodiment of the invention according to the first aspect, employing a beam splitter and a movable reflector.

In FIG. 2 an imaging lens 8 transmits light from a common path 2 to a beam splitter 9, embodied as a cube beam splitter, along a first path 3 to a first mirror by reflection and along a second path 4 to a second mirror 11 by transmission. The mirror 10 is fixed and somewhat inclined to the optic axis so that light reflected thereby and then transmitted by the splitter 9 is directed towards a first image area 12 of the sensitive surface 13 (the common plane) of a CCD camera. Mirror 11 is inclined in a similar sense so that light reflected thereby reaches surface 13 in a second image area 14. Mirror 11 is provided with rotational adjustment A to control the relative positions of regions 13 and 14, and is also provided with a transitional adjustment B along the original optic axis to alter the length of the second path relative to the first, so to enable images of axially spaced first and second object planes on path 2 to be brought into focus on surface 13.

Figure 3:
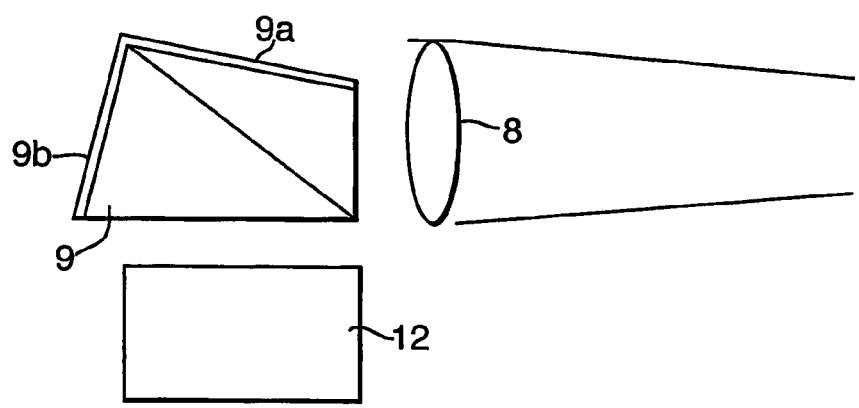
FIG. 3 shows a modification of FIG. 2 where the beam splitter and reflectors are combined into a single element.

FIG. 3 shows a modification of FIG. 2 in which the beam splitter and reflectors are combined into a single composite element, e.g. by appropriately adjusting the angle of the faces 9a, 9b of the splitter and silvering them.

Figure 4:
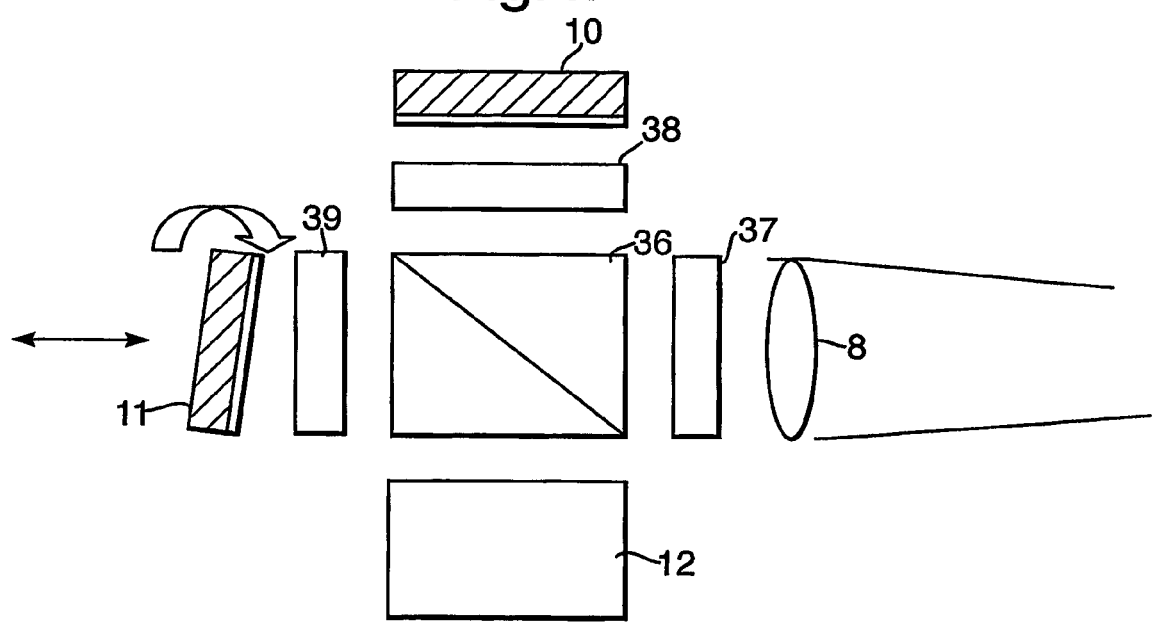
FIG. 4 shows a variant of the basic arrangement FIG. 2 using polarising optics.

FIG. 4 shows a second modification of the general scheme of FIG. 2, which employs a polarising beam splitter 36. Light incident of the splitter 36 is depolarised by a depolarising plate 37, for example a quartz/silica wedge depolariser, located either between the lens 8 and splitter 36 as shown, or on the other side of the lens 8. The polariser ensures that there is equal power in the two polarisations from splitter 36 without loss of power, and is hence superior to using (for example) an input polariser at 45° to the two required polarisation directions, or polarisers in the first and second paths. Quarter wave plates 38, 39 located in each of the two polarisations from splitter 36 then introduce a differential optical path length, thereby ensuring that the two coaxial object planes focussed on the sensor 12 are spaced. Clearly the arrangement of FIG. 4 could also incorporate a differential physical optical path difference as in FIG. 2 if desired.

Figure 5:
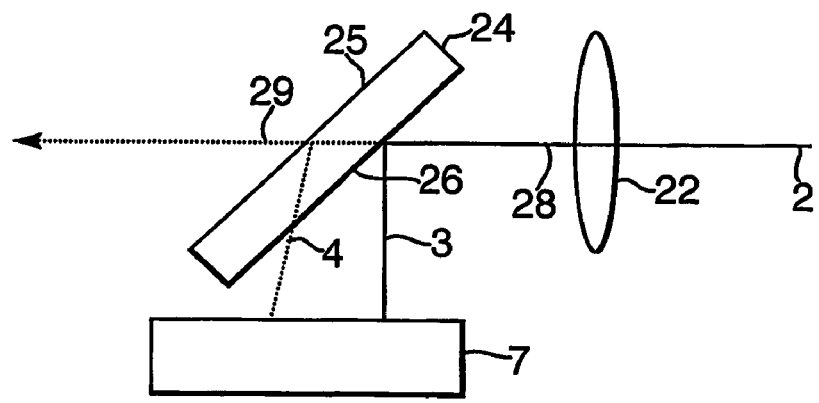
FIG. 5 shows in schematic form a third embodiment of the invention according to the first aspect, employing a wedge prism.

FIG. 5 shows an arrangement in which a wedge prism 24, having slightly inclined faces 25, 26 acts as a beam splitter to light from a common path 2 transmitted by an imaging lens 27. A first portion of the light 28 from the lens 27 is reflected at the first surface 26 of the prism along a first path 3 and is focussed on a common plane constituted by the sensitive surface of a CCD camera 7. A second portion of the light travelling along a second path 4 is reflected at the second surface 25 and focussed on camera 7 at a position laterally displaced from the first portion. The displacement arises partly from the thickness of the prism but also by virtue of an angular separation brought about by the wedge shape. The remaining light 29 is lost to the system or transmitted for another use.

Because the second path 4 between the beam splitting surface 26 and the CCD camera is longer optical path than the first path 3, principally because of the optically denser medium of the prism relative to air, the two laterally displaced focussed images on camera 7 relate to coaxial spaced object planes on path 2.

In FIGS. 1 and 5 the beam splitter provides angularly diverging first and second paths at its output face, and the angular divergence is carried through to the common plane. The reflectors of FIG. 2 to 4 also provide an angular divergence. Thus at least one of the paths is not normal to the surface and the related image cannot be in complete focus across its entire area. In each case, if desired, means known per se such as a tilted reflector could be provided in at least one of the separated paths to ensure strict parallelism, normal incidence on the common plane and consistent focus across the separated images. Nevertheless, in the arrangements of these Figures it is possible to provide an amount of divergence sufficient to provide spatially separated images on the common plane while maintaining a sufficient degree of focus across each image to permit effective measurement.

Figure 6:
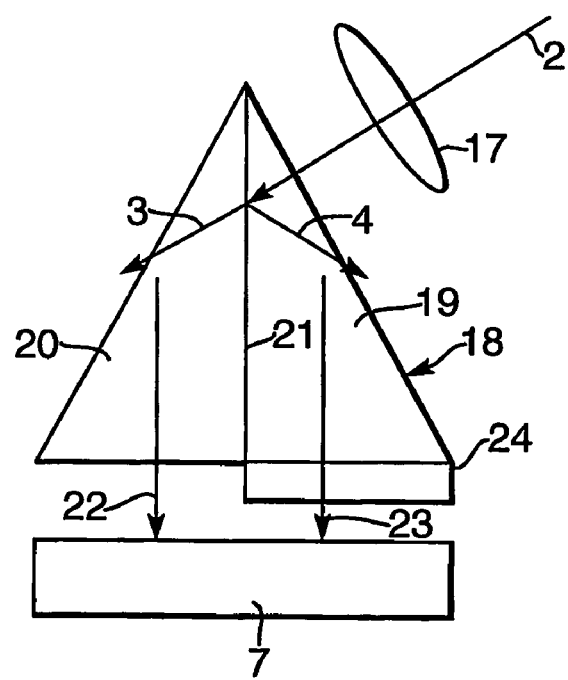
FIG. 6 shows in schematic form a fourth embodiment of the invention according to the first aspect, employing a Koesters prism.

FIG. 6 shows an arrangement where the first and second paths are parallel at the output of the splitter and at the common surface. It employs a Koesters prism 18, formed by joining two similar prisms 19, 20 along a common face 21. Light from a common path 2 and an imaging lens 17 is transmitted into the first prism 19 and is split at the common face 21, the beams 3 and 4 from which are transmitted and reflected at the face 21, eventually emerging as laterally displaced parallel beams 22, 23 for providing laterally spaced focussed images on the sensor surface of a CCD camera 7. Beam 23 is intercepted by a plate secured to (or adjacent) the bottom surface of the prism 19, thereby providing a longer optical (first) path length between surface 21 and the sensor surface for beam 23 relative to the (second) path length for beam 22. As a result the laterally spaced focussed images on the sensor surface are derived from different coaxial spaced object planes on path 2. A similar effect could be obtained by suitable shaping the lower surface of the prism 19.

In the foregoing embodiments optical elements are required to be inserted between an imaging lens and the sensor surface. The embodiment of FIG. 5 however, can be used as an "add-on" to a standard camera. Light along a common path 2 from the field of view is transmitted along a first path 3 by a non-polarising beam splitter 33 (embodied as a plate splitter) to a convex reflective surface 32 and then reflected by the splitter 33 to the lens 34 of a CCD camera 35. Light initially reflected by the splitter 33 along a second path 4 is reflected by a concave reflective surface 31 for transmission through the splitter to the lens 34. Surfaces 32 and 33 have long focal lengths so as effectively to alter the focal length of the camera lens for providing respective focussed images on the sensor surface (not shown) of the camera 35, and their axes are arranged so that the two images are formed separately in laterally displaced (contiguous or spaced) areas of the sensor surface.

Figure 7:
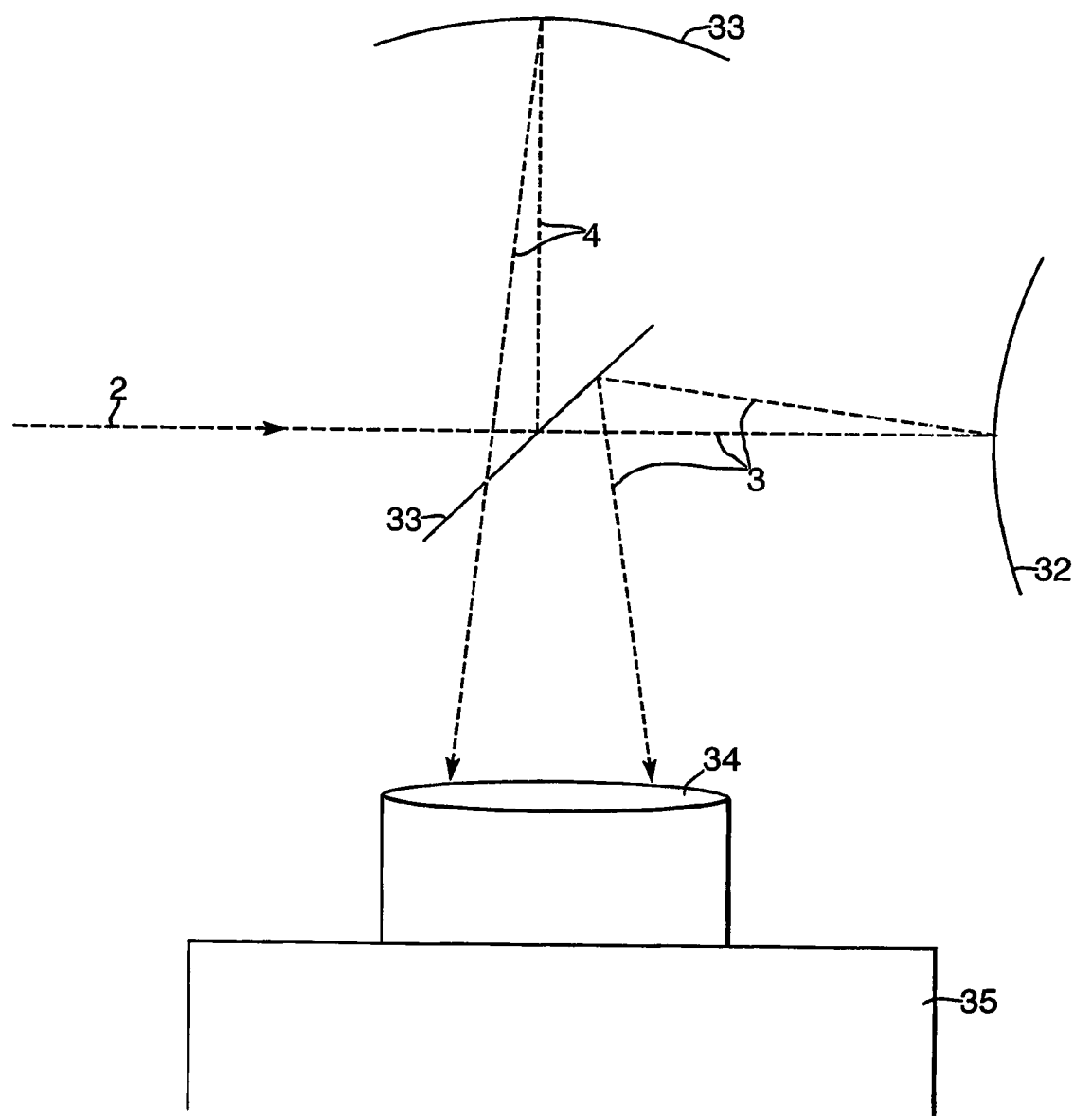
FIG. 7 shows in schematic form an embodiment of the invention according to the second aspect, in use in conjunction with a CCD camera and employing focussing reflectors in each of the first and second paths.

The use of reflective surfaces 31, 32 in FIG. 7 reduces the amount of dispersion in the system compared to the use of lenses. The (main) focussing means of any of the arrangements of FIGS. 1 to 4 could also be replaced by a reflective means for reducing dispersion, and the camera of FIG. 7 could also have its lens replaced by a suitably arranged reflector, although normally this would go against providing the additional elements as an "add-on" arrangement.

Although an CCD imaging sensors has been particularly mentioned, it could of course be substituted by any other known form of electronic imaging system or sensor, or an imagewise radiation recording medium such as photographic film.

The invention claimed is:

1. Optical apparatus for simultaneously focussing first and second coaxially spaced object planes in respective separate first and second areas of a common image plane, the apparatus comprising:
   non-diffractive beamsplitter means for receiving light from said coaxially spaced object planes along a common path and for transmission to said first and second image areas of said common image plane along respective first and second optical paths, and
   focussing means for bringing said first and second object planes into focus in said first and second areas of said common image plane.

2. Apparatus according claim 1 and further comprising image sensor means with a sensor surface in said common focal plane for receiving said focussed images and providing respective image signals.

3. Apparatus according to claim 1 wherein said focussing means comprises at least one transmissive focussing element.

4. Apparatus according to claim 3 wherein said focussing element is a birefringent lens.

5. Apparatus according to claim 4 wherein said birefringent lens also provides said beam splitter means.

6. Apparatus according to claim 1 wherein said focussing means comprises at least one reflective focussing element.

7. Apparatus according to claim 1 wherein said focussing means comprises at least two focussing elements.

8. Apparatus according to claim 7 wherein said beamsplitter is located between two of said focussing elements.

9. Apparatus according to claim 7 wherein said first and second paths comprise different ones of said focussing elements.

10. Apparatus according to claim 1 wherein said focussing means is located between said beam splitter means and said common plane.

11. Apparatus according to claim 1 wherein said beam splitter means is between said focussing means and said common plane.

12. Apparatus according to claim 1 wherein the beam splitter means provides output beams having different polarisations, or the first and second paths comprise means for selecting different polarisations.

13. Apparatus according to claim 12 wherein said common path comprises a depolarising means.

14. Apparatus according to claim 1 wherein the first and second paths have the same optical length.

15. Apparatus according to claim 1 wherein the first and second paths have different optical lengths.

16. Apparatus according to claim 15 wherein the different optical path lengths are provided by optical components located to physically extend one path relative to the other.

17. Apparatus according to claim 16 wherein said appropriately located optical components comprises reflective surfaces in said separate optical paths for returning light to the beamsplitter and thence to said common focal plane, said mirrors being unequally spaced from said beamsplitter to physically extend one path relative to the other.

18. Apparatus according to claim 15 wherein the path lengths are optically differentiated by incorporating in at least one path an optical delay means.

19. Apparatus according to claim 18 wherein said beam splitter and said optical delay means are provided by a common optical element.

20. Apparatus according to claim 18, wherein said delay means comprises a plate which acts differently towards said different polarisations.

21. Apparatus according to claim 18 wherein said focussing means and said delay means are provided by a common optical element.

22. Apparatus according to claim 18 wherein said beamsplitter comprises a Koesters prism, having a said optical delay means in the form of a plate of light transmissive material secured thereto or integral therewith to intercept only one of said first and second paths.

23. A wavefront sensing or measurement system comprising apparatus according to claim 1.

24. A 3-D imaging system comprising apparatus according to claim 1.

25. Optical apparatus for use with an auxiliary lens for simultaneously focussing first and second coaxially spaced object planes in respective separate first and second areas of a common image plane, the apparatus comprising:
   non-diffractive beamsplitter means for receiving light from said coaxially spaced object planes along a common path and for transmission to said first and second image areas along respective first and second optical paths, and
   focussing means, in conjunction with said auxiliary lens, for focussing said first and second object planes in said first and second areas of said common image plane.

* * * * *